Figure 1:
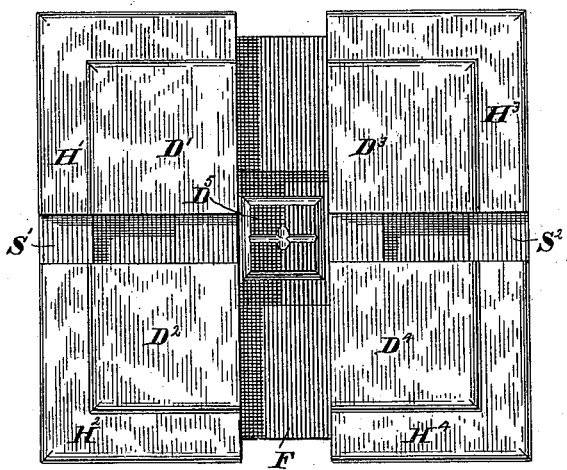

(No Model.)  3 Sheets—Sheet 1.

C. D. ROGERS.
METHOD OF MAKING BARBED FENCE WIRE.

No. 290,272.  Patented Dec. 18, 1883.

Witnesses:
W. W. Swan
W. E. Lombard.

Inventor:
Chas. D. Rogers

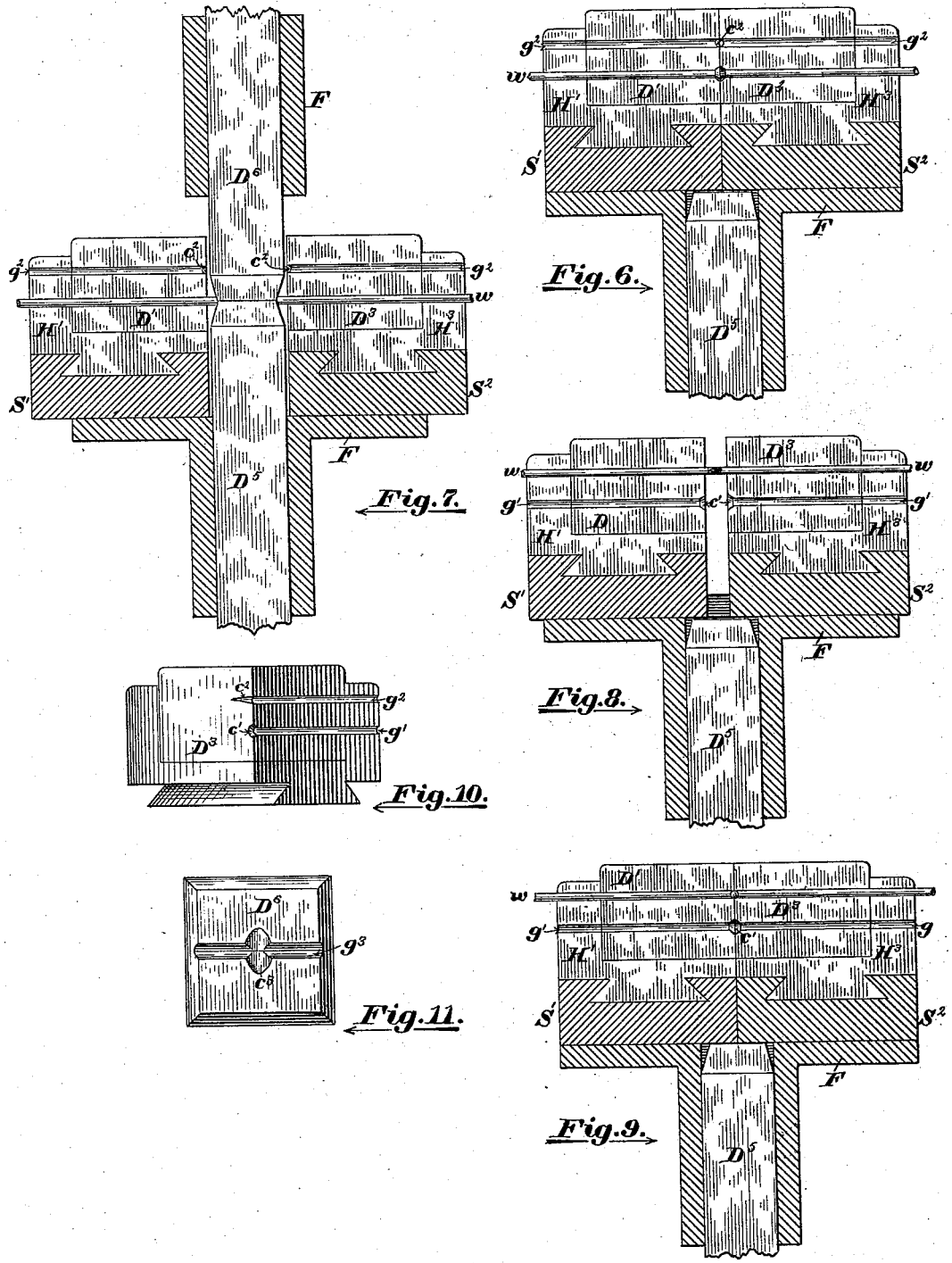

(No Model.) 3 Sheets—Sheet 3.

C. D. ROGERS.
METHOD OF MAKING BARBED FENCE WIRE.

No. 290,272. Patented Dec. 18, 1883.

Witnesses:
W. W. Swan
W. E. Lombard.

Inventor:
Chas. D. Rogers

UNITED STATES PATENT OFFICE.

CHARLES D. ROGERS, OF PROVIDENCE, RHODE ISLAND.

METHOD OF MAKING BARBED FENCE-WIRE.

SPECIFICATION forming part of Letters Patent No. 290,272, dated December 18, 1883.

Application filed October 21, 1882. (No model.)

*To all whom it may concern:*

Be it known that I, CHARLES D. ROGERS, of Providence, in the State of Rhode Island, have invented an Improvement in the Method of Forming Barbed Wire for Fences, of which the following is a specification.

The smooth wire employed in the construction of the barbed wire is of the size ordinarily used for fencing, and the spikes or barbs are thrown or struck out therefrom by the successive or repeated action of dies at each place therein at which a spike or barb is required.

I have devised several ways slightly differing from each other, but of the same general character, for throwing out spikes or barbs integral with the wire by the action of dies, to some of which I shall hereinafter refer; but I first proceed to describe in detail a method which is illustrative of them all, and which I consider to be the most advantageous.

In the drawings I have shown both the wire at different stages of manufacture, and suitable dies in such varying positions as will illustrate their operation.

Figures 1 to 11, inclusive, are illustrative more especially of the dies, while Figs. 12 to 16, inclusive, show the wire alone at different stages of manufacture.

Figure 12:
Figure 13:
Figure 14:
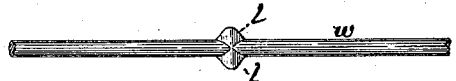
Figure 15:
Figure 16:
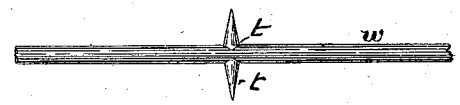

It is sufficient to state at first that Fig. 1 is a plan of the dies with the upper vertical die omitted, and that Fig. 12 is a section of plain wire.

Reference to the other figures will occur hereinafter.

It is not necessary to show mechanism for moving the dies, but F represents a portion of the frame of a machine containing them.

D' D² D³ D⁴ represent four dies rigidly secured to four die-holders, H' H² H³ H⁴, which are dovetailed, as shown, to two slides, S' S², so that the die-holders H' and H² have a horizontal movement to and from each other in the slide S', and the die-holders H³ and H⁴ a horizontal movement to and from each other in slide S². The slides S' and S² are dovetailed to the frame F, so as to have a horizontal movement to and from each other at right angles to the movements of the die-holders. The dies D' D² D³ D⁴, accordingly, may be worked in pairs—D' D² and D³ D⁴—the dies of each pair having a movement to and from each other, and each pair of dies having a movement to and from the other pair. Each die D' D² D³ D⁴ in its face opposite to the other die of its pair has two grooves, $g'$ and $g^2$, and at the inner angle or corner of each die, at the end of the grooves $g'$ $g^2$, respectively, are countersinks $c'$ $c^2$, a further description of which will hereinafter be given. (See Fig. 10, which is a corner view of one of said dies.)

D⁵ and D⁶ are two dies having vertical movements to and from each other in the fra F, and are arranged to meet in the horizontal plane bisecting the grooves $g'$ of the dies D' D² D³ D⁴. The operating-faces of the vertical dies D⁵ and D⁶ are alike. That of D⁵ is shown at Fig. 1, and again partially at Fig. 2. The operating-face of the die D⁶ is shown at Fig. 11 of actual size. Each die D⁵ D⁶ has across its face a groove, $g^3$, with a countersink, $c^3$, at the middle, as will hereinafter more fully appear. The wire is marked W, and each of the grooves $g'$ $g^2$ $g^3$ is of a proper size to hold half of a section of wire of corresponding length, as shown.

Figure 2:
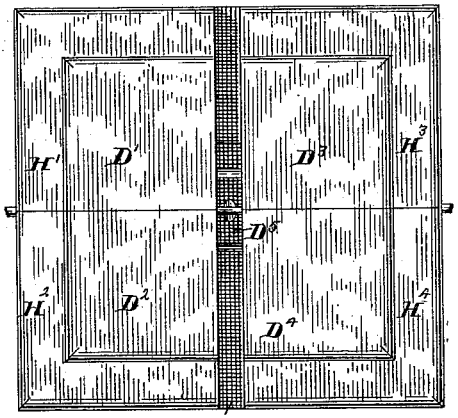
Figure 3:
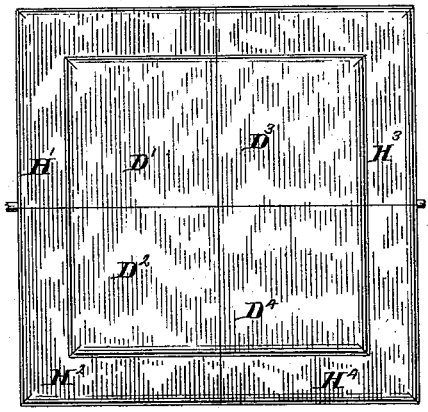
Figure 4:
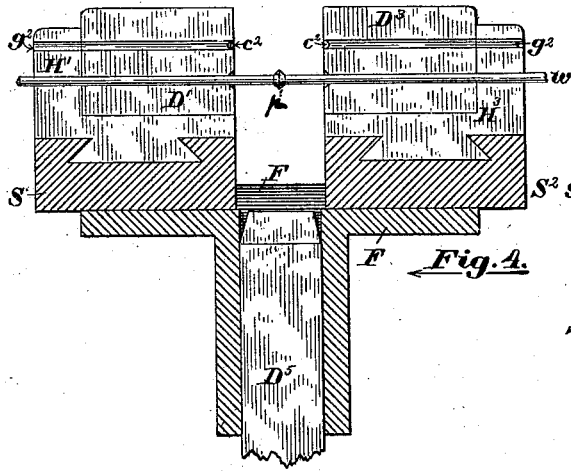
Figure 5:
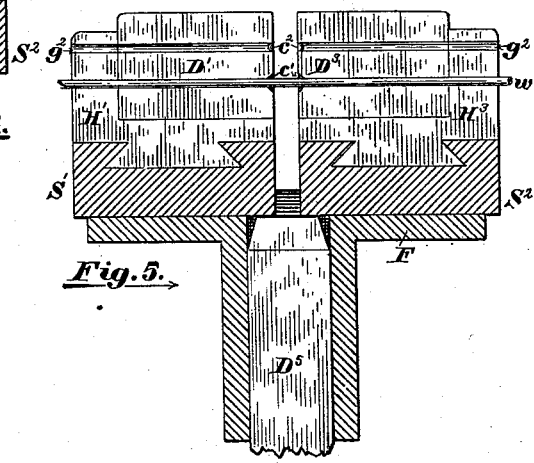

The operation of the dies which have been thus described is as follows: The slides S' S² being apart, as shown at Fig. 1, and the dies of each pair D' D² and D³ D⁴ being also apart, as there shown, the slides are brought nearly together, or to the position represented at Figs. 2 and 5, and then the dies of each pair D' D² and D³ D⁴ are made to approach each other and clasp or clamp the wire W, which is so presented to the said dies as to be received in the lower groove, $g'$, as shown at Fig. 2. (See Fig. 5.) The two slides S' S² then come fully together, as shown at Figs. 3 and 6, and the metal of the wire which was between the slides is upset in the countersinks $c'$, so that a flange is formed thereon, as shown at $p$, Figs. 4 and and 13. This method of forming a flange upon a wire by clamping it and upsetting it through linear compression is old, and my invention requires or results from a further operation or action of dies upon a flange or projection thus thrown out. For this further operation the slides S' S² are opened sufficiently to allow the vertical dies to operate between them, the dies of each slide being also sufficiently opened to slide upon the wire. (See Fig. 4.) The vertical dies D⁵ D⁶ now come together, as shown at Fig. 7, thereby breaking the flange shown at Figs. 4 and 13, and causing it to assume the shape shown in vertical and horizontal elevation at $l$, Figs. 14 and 15. The vertical dies $D^5$ $D^6$ are now withdrawn, the dies of each pair $D'$ $D^2$ and $D^3$ $D^4$ opened, the slides $S'$ and $S^2$ brought to the position shown at Figs. 2 and 8, the wire removed from the lower groove, $g'$, and so held as to be grasped in the upper groove, $g^2$, by the dies $D'$ $D^2$ and $D^3$ $D^4$, which are again made to assume the position shown at Fig. 2. (See Fig. 8.) Next the slides come fully together and further upset the projections shown at $l$, Figs. 14 and 15, so that they take the shape shown at $t$, Fig. 16. By the successive or repeated action of dies upon a projection once thrown out from the wire, the original projection is brought to a required shape in a manner analogous to the spinning of metal by the repeated action of dies or the hammering of metal to a required form by repeated blows when a single blow of the hammer will not serve the purpose. Therefore, to form long integral spikes on a wire, the slides $S'$ $S^2$ are brought together by gradual and repeated approaches, throwing out a little metal at a time, or throwing it a little farther at each time, and the attempt is not made at any stage of the process to throw out the metal to a required shape at one operation.

It follows that instead of employing the second groove, $g^2$, and countersink $c^2$ in the horizontal dies $D'$ $D^2$ $D^3$ $D^4$, substantially the same result which is obtained by the second operation of those dies when the wire is held in the grooves $g^2$ may be obtained by changing the countersinks in the vertical dies $D^5$ $D^6$ to correspond to the spike required, and then repeatedly operating the vertical dies upon the flange thrown out at the first operation of the horizontal dies when the wire was held in the grooves $g'$. The repeated action of a single pair of dies is equivalent to the successive operation of two or more pairs of dies.

It is obvious that the projection thrown out by the operation of the first pair of dies may be other than a flange entirely surrounding the wire.

I claim—

The herein-described method of striking a spike or barb from a wire by the successive or repeated action of dies at the place in the wire at which the spike or barb is to project, substantially as described.

CHARLES D. ROGERS.

Witnesses:
W. W. SWAN,
W. E. LOMBARD.